United States Patent [19]
Carraro

[11] Patent Number: 5,161,649
[45] Date of Patent: Nov. 10, 1992

[54] MULTIPLE DISK BRAKE HAVING A CLEARANCE TAKE-UP DEVICE

[75] Inventor: Timante Carraro, Campodarsego, Italy

[73] Assignee: Carraro S.p.A., Padova, Italy

[21] Appl. No.: 619,566

[22] Filed: Nov. 29, 1990

[30] Foreign Application Priority Data

Dec. 6, 1989 [IT] Italy ................................ 41759 A/89

[51] Int. Cl.⁵ ............................................. F16D 65/38
[52] U.S. Cl. .................................. 188/718; 188/196 P
[58] Field of Search .................. 188/196 P, 71.8, 72.3, 188/72.4; 192/111 A

[56] References Cited

U.S. PATENT DOCUMENTS

| | | | |
|---|---|---|---|
| 3,762,522 | 10/1973 | Kirschling | 188/71.8 X |
| 4,375,842 | 3/1983 | Melinat | 188/71.8 |
| 4,436,186 | 3/1984 | Ritsema et al. | 188/71.8 |
| 4,540,068 | 9/1985 | Ritsema | 188/196 P X |

*Primary Examiner*—Robert J. Oberleitner
*Assistant Examiner*—Lee W. Young
*Attorney, Agent, or Firm*—Sughrue, Mion, Zinn, Macpeak & Seas

[57] ABSTRACT

A multiple disk brake is disclosed which includes a pusher movable toward and away from a friction surface, spring means urging the pusher away from the friction surface, at least one bush slidable to an interference fit within a corresponding seat of the pusher to limit a return stroke of the latter, at least one corresponding link for limiting to a predetermined length the movement of the bush relatively to a brake abutment surface, which comprises a spacer between a head of the link and the abutment surface. Thus, the effect of the machining tolerances of the link components on restoration of an optimum clearance between the pusher and the friction surface is attenuated.

7 Claims, 2 Drawing Sheets

MULTIPLE DISK BRAKE HAVING A CLEARANCE TAKE-UP DEVICE

BACKGROUND OF THE INVENTION

This invention relates to a disk brake of a type including:

a pusher movable toward and away from a friction surface defined on at least one brake disk;

spring means urging the pusher away from the friction surface;

at least one bush sliding in interference fit within a corresponding seat of the pusher and adapted to abut on an abutment surface of the brake to limit a return stroke of the pusher away from the friction surface; and at least one corresponding link acting between said bush and said abutment surface to limit the bush travel relatively to said abutment surface such that it be a predetermined distance effective to define, with the brake released, a predetermined clearance between the pusher and the friction surface.

A brake having such features is known from the Applicant's production.

Traditional hydraulically operated brakes, specifically intended for application to axles of agricultural tractors or industrial vehicles, have provisions for keeping the clearance between the pusher and the friction surfaces substantially constant with the brake released. This clearance is necessary to allow for free rotation of the disks and to prevent wear of the friction surfaces with the brake released, and would tend to increase in use of the brake as a result of the friction surfaces undergoing progressive wear. Any uncontrolled increase of this clearance is bound to cause increased length of the stroke required to bring the pusher to contact the friction surfaces, and hence increased oil requirements to apply the brake. This increased requirement for oil may in certain circumstances exceed the capacity of the brake pump (customarily foot operated) provided for delivering oil under a pressure to the actuator that actuates the pusher. In that case, one stroke of the brake pedal would be inadequate to immediately and effectively apply it, which results in an obviously hazardous situation for the user. In all cases, the stroke length of the brake pedal will increase progressively over time.

The above-mentioned provisions include a plurality of bushes, sliding in interference fit within respective seats and adapted to be pulled by the pusher (through corresponding links) during the brake application stroke, only after a predetermined active travel of the pusher. This predetermined active travel, or loose movement of the pusher before the bushes begins pulled, is substantially equal to the normal clearance provided in the rest condition between the pusher and the friction surfaces, and is determined by the difference between the axial length of the bushes and the distance of the heads of the corresponding links from an abutment surface of the brake.

Presently, this distance is heavily affected by machining tolerances, especially axial dimension tolerances, of different components, among which the bushes, the link shanks, the washers interposed between the link heads and the corresponding bushes, and between the link bases and the pusher surface.

Owing to said components interleaving with one another, individual tolerances add up with the brake in the assembled condition, and the overall dimensional error may grow enough to again affect proper operation of the brake.

On the other hand, any recourse to closer limits for the admissible machining tolerances of each component would unavoidably reflect in unacceptably increased costs, and interfere with the possibility to use standard production parts, such as for the screws that form the links.

SUMMARY OF THE INVENTION

The problem that underlies this invention is to provide a disk brake which is constructed such that the influence of the machining tolerances of those members which are to take up the increased clearance from wear of the friction surfaces can be appreciable less than with brakes according to the mentioned prior art. In the context of this invention, the term disk brake is intended to include either single disk or multiple disk brakes.

This problem is solved according to the invention by a brake as indicated being characterized in that it comprises a spacer interposed between a head of said link active on said bush and said abutment surface.

The inventive concept underlying this invention is therefore that of making the clearance between the pusher and the friction surfaces to depend basically on the spacer length and related machining tolerances, while being substantially unaffected by the dimensional tolerances of the remaining components of the link.

BRIEF DESCRIPTION OF THE DRAWINGS

The features and advantages of this invention will be more clearly apparent from the following detailed description of a preferred embodiment thereof, given by way of illustration and not of limitation with reference to the accompanying drawings, where.

DETAILED DESCRIPTION OF THE INVENTION

Figure 1:
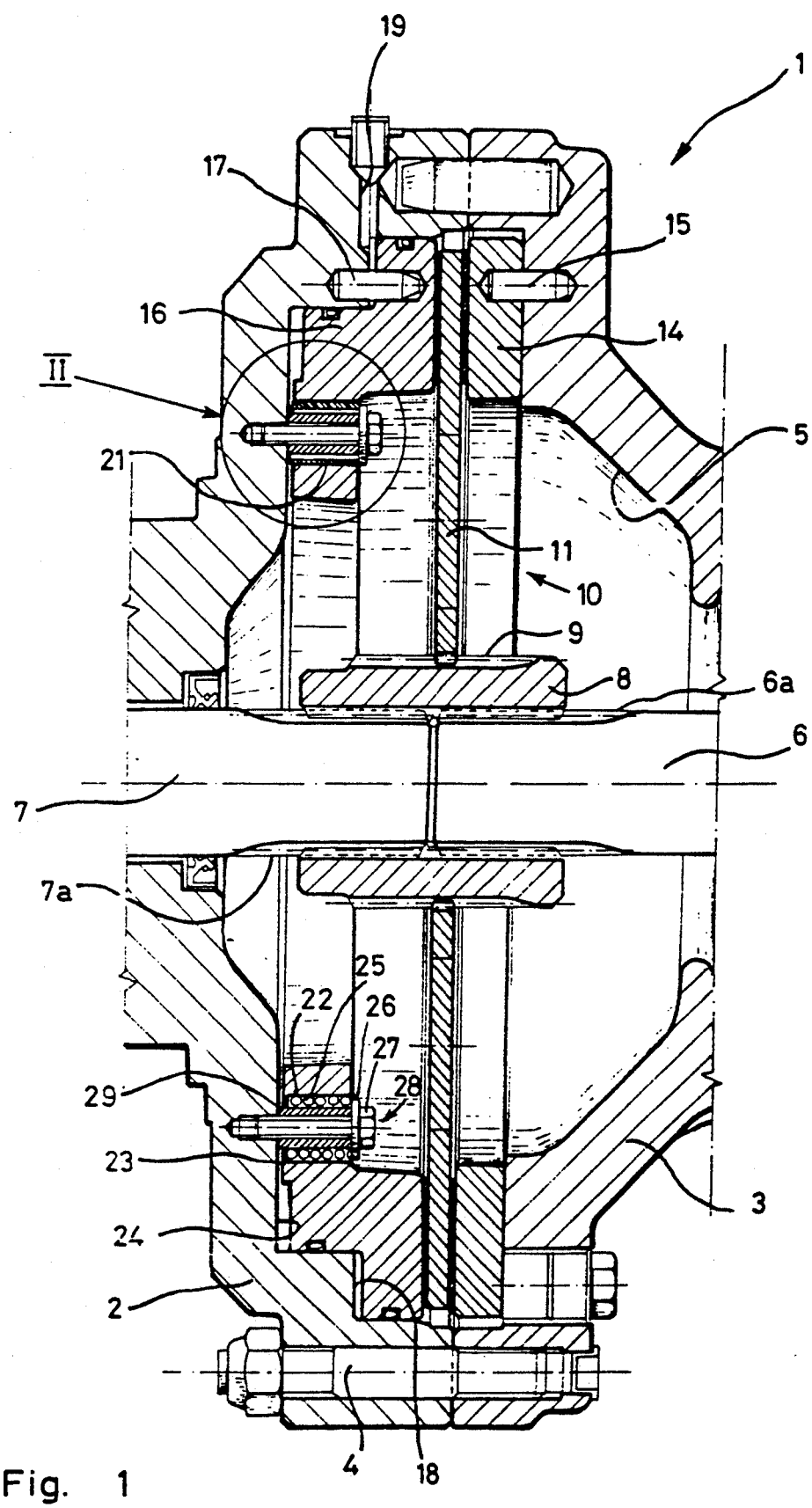
FIG. 1 is a sectional view showing schematically a vehicle axle incorporating a brake according to the invention.

Throughout the drawing views, generally shown at 1 is a case or load-bearing surface of a vehicular axle (only partly shown) which includes two case halves 2, 3 held together by captive screws 4 to jointly define a chamber 5 wherein a single disk brake 10 according to the invention is accommodated. In a thoroughly equivalent fashion, the brake 10 may be of the multiple disk type.

Within the case 1, there are supported two axle shafts 6, 7 which are made rotatively rigid with each other by an internally splined sleeve 8 joining together respective splined ends 6a, 7a.

The sleeve 8 has further splines 9 externally over which a brake disk, generally shown at 11, fits for rotation therewith and is allowed to float axially.

Defined at the periphery of the disk 11 are two oppositely located friction surfaces 12 and 13, respectively, which are formed of conventional linings subjected to wear.

Mounted to face the friction surface 13 is a stationary flange 14 on the case half 3 whereto it is held by pins 15. An annular piston 16 is mounted on the case half 2 so as to be facing the surface 12.

The piston 16 is made fast rotatively with the case half 2 by means of pins 17 and is slidable in a sealed fashion within a seat 18 of the corresponding case half 2 to bound in combination therewith a chamber to which a working fluid, such as oil under a pressure, can be supplied through a conduit 19 to axially drive the piston toward and away from the friction surfaces 12, 13. The piston 16 forms, in combination with the flange 14, a pusher for operating the brake 10 hydraulically.

Said piston 16 is also formed with a flange 20 which extends radially inwards. At the location of said flange 20, there is defined on the case half 2 an abutment surface 24 whose function will be explained hereinafter.

The flange 20 is formed with a plurality of through-going holes 21 which are arranged into a ring of holes alternating with through-going holes 22 shaped to define a shoulder 23 on the side next to the case half 2.

A coil spring 25 is fully received within each hole 22 and intervenes between the shoulder 23 and a washer 26, in turn abutting the head 27 of a link 28.

The link 28 consists of a screw having a sleeve 29 of predetermined axial length fitted over its shank. Each link 28 threads into a corresponding threaded hole provided in the abutment surface 24 until the sleeve 29 bottoms out between the washer 26 and the surface 24. This applies an elastic pre-load to the spring 25 tending to constantly urge the piston 16 away from the friction surface 12. The amount of this elastic pre-load is determined by the axial length of the sleeve 29, accounting for its machining tolerances. Unaffecting are instead the machining tolerances of the screw and the washer which make up the link 28 and may be, accordingly, standard commercial components.

Each of the holes 21 accommodates a bush 30 in interference fit relationship which can contract radially by the provision of a lengthwise cut, not shown. Such bushes are currently available on the market as split bushes or pins.

The friction created by the interference of the hole 21 walls with the bushes 30 is substantially greater than the pre-load of the springs 25, thereby the bushes can undergo no displacement within the corresponding holes due to the action of the springs 25.

Mounted coaxially within each bush is a link 31 including a screw 32 whose shank is threaded into a corresponding threaded hole of the abutment surface 24. The screw 32 has at its free end a head 33 against which a washer 34 abuts which, in turn, acts on the corresponding bush 30 to restrict its displacement with the piston 16 during the movement of the latter.

Fitted over the shank of each screw 32 is a tubular sleeve 35 which is accordingly interposed and functions as a spacer between the abutment surface 24 and the washer 34. The axial length dimension of the sleeves 35 is greater than the length dimensions of the bushes 30 by an extent X which is equal to the optimum clearance sought, with the brake released, between the pusher 14, 16 and the friction surfaces 12, 13.

Like in the instance of the links 28, the single factor which affects the clearance X is, additionally to the dimensional tolerances of the bushes 30, the tolerance for the axial dimension of the sleeve 35.

Thus, standard commercially available screws 32 and washers 34 may be used. Preferably, for convenience of inventory, the component parts of the links 31 (screws 32, washers 34, and sleeves 35) are made identical with the corresponding components of the links 28.

Figure 2:
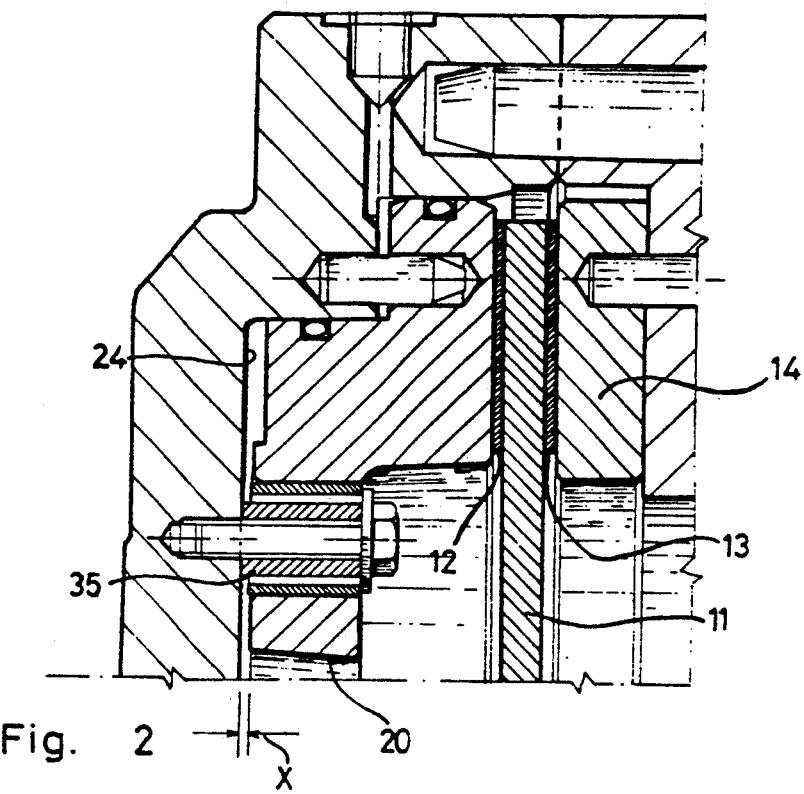
FIGS. 2 and 3 show to an enlarged scale the detail pointed to by the arrow II in FIG. 1 relating to new and worn friction surfaces, respectively.
Figure 3:
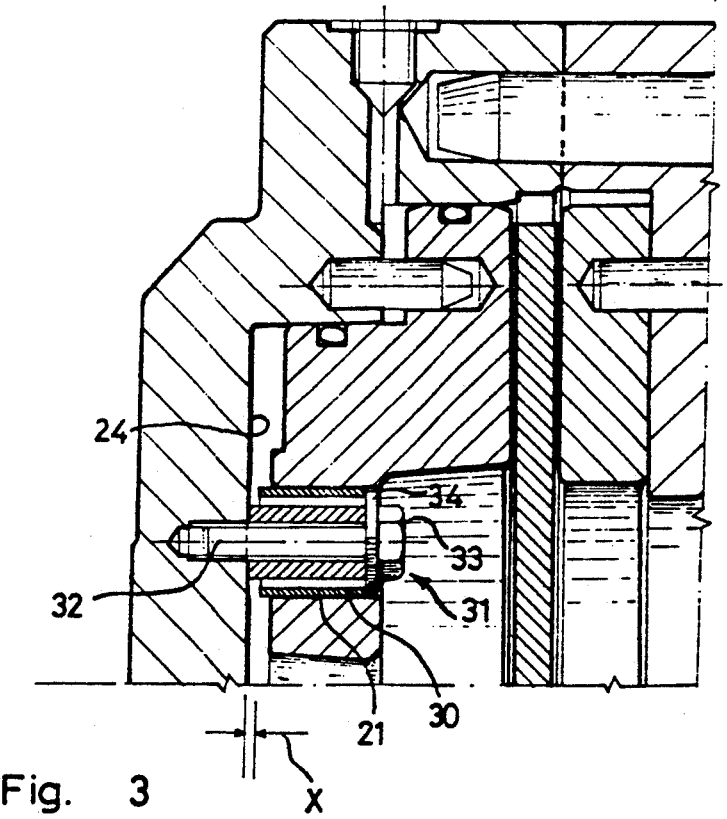

FIGS. 2 and 3 show the inventive brake with new and worn friction surfaces, respectively.

With the brake in the released state, the piston 16 is held close against the abutment surface 24 through that portion of the bushes 30 which juts out of the holes 21. The extent of the bush 30 projection from the holes 21 will change with the amount of wear of the friction surfaces, as explained hereinafter.

To apply the brake, oil is forced through the conduit 19 to displace the piston 16 such that it will press the disk 11 against the flange 14. The bushes 30 are shifted together with the flange 20 of the piston 16 until they abut on the washer 34 of the corresponding links 31. Simultaneously therewith, the springs 25 are compressed.

On the displacement of the piston 16 exceeding the amount of displacement accorded to the bushes 30 by the links 31, the bushes are caused to slide axially within their respective holes 21, overcoming the drag due to friction. Consequently, the amount will change of bush projection out of the holes 21 in the direction toward the abutment surface 24. This change in the amount the bushes project equals the decrease undergone in thickness by the linings due to wear. On releasing the brake, the piston 16 is urged by the springs 25 to return toward the abutment surface 24, until it actually abuts it via the bushes 30.

This return stroke is always constant and equal to the optimum clearance X to allow free rotation for the disk 11. This enables the amount of pressurized oil required for renewed application of the brake to be substantially constant and limited.

Among the primary advantages afforded by this invention is that the above-noted result is ensured even where commercial components subject to relatively large machining tolerances are used in the construction of the device for taking up the clearance between the pusher and the friction surfaces.

In addition, since the elements which make up the links are the same for both the springs and the bushes, a valued advantage is secured in that such elements can be standardized.

A further advantage is that by changing the axial length of the spacer, the amount can be varied of the clearance specified between the pusher and the friction surfaces, thereby enhancing the degree of standardization of the clearance take-up device for use on different brakes. Also, since the single link factor that affects the amount of clearance between the pusher and the friction surfaces is the length dimension of the spacer, different machining tolerances of the same may be accommodated to suit different brakes.

I claim:

1. A disk brake including:
   a pusher movable toward and away from a friction surface defined on at least one brake disk;
   spring means urging the pusher away from the friction surface;
   at least one bush sliding in interference fit within a corresponding seat of the pusher and adapted to abut on an abutment surface of the brake to limit a return stroke of the pusher away from the friction surface; and
   at least one corresponding link acting between said bush and said abutment surface to limit the bush travel relatively to said abutment surface such that it be a predetermined distance effective to define, with the brake released, a predetermined clearance between the pusher and the friction surface;

wherein said link includes a spacer interposed between a head of said link and said abutment surface and said bush acts against said head to limit movement of said bush away from said abutment surface to said predetermined distance.

2. A brake according to claim 1, wherein said link consists of a screw having a shank with a threaded portion at one end threaded into said abutment surface, and said head at an opposite end, and said spacer comprises a tubular sleeve fitted over the shank of said screw and adapted to be clamped tightly between said head and said abutment surface.

3. A brake according to claim 2, wherein said link includes a washer between the screw head and the tubular sleeve.

4. A brake according to claim 1, wherein said spring means comprise at least one spring acting under a preset load between said pusher and a corresponding link implanted in said abutment surface.

5. A brake according to claim 4, wherein said link comprises a screw having a shank having a threaded portion at one end threaded into said abutment surface and having said head at an opposite end, a tubular spacer being fitted over the shank of said screw and adapted to be clamped tight between said head and said abutment surface to set the elastic preload of said spring.

6. A brake according to claim 5, wherein said spring is substantially fully accommodated within a seat of the pusher.

7. A brake according to claim 1, wherein said pusher includes a brake-actuating piston.

* * * * *